(12) United States Patent
Valverde, Jr. et al.

(10) Patent No.: US 11,262,203 B2
(45) Date of Patent: *Mar. 1, 2022

(54) SCORING SYSTEM FOR TRAVEL PLANNING

(71) Applicant: Amgine Technologies (US), Inc., Dover, DE (US)

(72) Inventors: L. James Valverde, Jr., Washington, DC (US); Harold Roy Miller, Toronto (CA); Jonathan David Miller, Austin, TX (US)

(73) Assignee: Amgine Technologies (US), Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,753

(22) Filed: Apr. 21, 2020

(65) Prior Publication Data

US 2020/0249034 A1    Aug. 6, 2020

Related U.S. Application Data

(63) Continuation of application No. 16/055,767, filed on Aug. 6, 2018, now Pat. No. 10,634,508, which is a
(Continued)

(51) Int. Cl.
*G01C 21/34* (2006.01)
*G06Q 10/04* (2012.01)
(Continued)

(52) U.S. Cl.
CPC ....... *G01C 21/343* (2013.01); *G01C 21/3423* (2013.01); *G06Q 10/02* (2013.01); *G06Q 10/047* (2013.01); *G06Q 30/0282* (2013.01)

(58) Field of Classification Search
CPC .............. G01C 21/343; G01C 21/3423; G06Q 30/0282; G06Q 10/02; G06Q 10/047
See application file for complete search history.

(56) References Cited

U.S. PATENT DOCUMENTS 5,557,524 A    9/1996  Maki
5,797,127 A    8/1998  Walker et al.
(Continued)

OTHER PUBLICATIONS

Non-Final Office Action and Notice of References Cited dated Sep. 26, 2017 in U.S. Appl. No. 15/178,453 (12 pages).
(Continued)

*Primary Examiner* — Dale W Hilgendorf
(74) *Attorney, Agent, or Firm* — Dickinson Wright PLLC (57) ABSTRACT

A method for facilitating travel reservations is described. The method may commence with receiving a travel-related query from a user and parsing the travel-related query to derive at least one attribute of the travel-related query. One or more further users may be selected based on comparing the at least one attribute of the user with attributes of the one or more further users. The at least one attribute of the user may be ranked based on preference data of the one or more further users. The method may continue with assigning weights to the at least one attribute based on the ranking to create at least one weighted attribute. Feasible travel itineraries may be searched based on the at least one attribute. The feasible travel itineraries may be scored based on the at least one weighted attribute and travel itineraries selected based on the scoring may be presented.

16 Claims, 5 Drawing Sheets

Related U.S. Application Data continuation of application No. 15/178,453, filed on Jun. 9, 2016, now Pat. No. 10,041,803.

(60) Provisional application No. 62/181,664, filed on Jun. 18, 2015.

(51) Int. Cl.
*G06Q 10/02* (2012.01)
*G06Q 30/02* (2012.01)

(56) References Cited

U.S. PATENT DOCUMENTS

| | | | |
|---|---|---|---|
| 5,832,452 | A | 11/1998 | Schneider et al. |
| 5,948,040 | A | 9/1999 | DeLorme et al. |
| 6,059,724 | A | 5/2000 | Campell et al. |
| 6,275,808 | B1 | 8/2001 | DeMarcken |
| 6,307,572 | B1 | 10/2001 | DeMarcken et al. |
| 6,477,520 | B1 | 11/2002 | Malaviya et al. |
| 6,553,310 | B1 | 4/2003 | Lopke |
| 6,795,710 | B1 | 9/2004 | Creemer |
| 7,092,892 | B1 | 8/2006 | Sobalvarro et al. |
| 7,219,073 | B1 | 5/2007 | Taylor et al. |
| 7,286,998 | B2 | 10/2007 | Sauser et al. |
| 7,302,398 | B2 | 11/2007 | Ban et al. |
| 7,680,777 | B2 | 3/2010 | Poston et al. |
| 7,860,808 | B2 | 12/2010 | Peters |
| 7,912,734 | B2 | 3/2011 | Kil |
| 7,979,457 | B1 | 7/2011 | Garman |
| 7,983,956 | B1 | 7/2011 | Goel |
| 8,005,685 | B1 | 8/2011 | Bird |
| 8,035,511 | B2 | 10/2011 | Weaver et al. |
| 8,165,920 | B2 | 4/2012 | Goel |
| 8,224,665 | B2 | 7/2012 | Morris |
| 8,332,247 | B1 | 12/2012 | Bailey et al. |
| 8,510,133 | B2 | 8/2013 | Peak et al. |
| 8,600,784 | B1 * | 12/2013 | Ivey .................. G06F 16/9038 705/5 |
| 8,600,830 | B2 | 12/2013 | Hoffberg |
| 8,631,007 | B1 | 1/2014 | Blandford et al. |
| 8,762,160 | B2 | 6/2014 | Lulla |
| 9,031,853 | B2 | 5/2015 | Bartfeld et al. |
| 9,043,151 | B2 | 5/2015 | Cai et al. |
| 9,286,629 | B2 | 3/2016 | Miller et al. |
| 9,449,151 | B2 | 9/2016 | Etchegoyen |
| 9,659,099 | B2 | 5/2017 | Miller et al. |
| 9,946,839 | B1 | 4/2018 | Wilson et al. |
| 10,041,803 | B2 * | 8/2018 | Miller .................. G01C 21/343 |
| 10,078,855 | B2 | 9/2018 | Miller et al. |
| 10,210,270 | B2 | 2/2019 | Miller et al. |
| 10,275,810 | B2 | 4/2019 | Miller et al. |
| 10,282,797 | B2 | 5/2019 | Valverde, Jr. et al. |
| 10,634,508 | B2 * | 4/2020 | Valverde, Jr. ...... G06Q 30/0282 |
| 2001/0044788 | A1 | 11/2001 | Demir et al. |
| 2002/0069133 | A1 | 6/2002 | Currie et al. |
| 2002/0082877 | A1 | 6/2002 | Schiff et al. |
| 2002/0147619 | A1 | 10/2002 | Floss et al. |
| 2002/0173978 | A1 * | 11/2002 | Boies et al. ........... G06Q 10/02 705/6 |
| 2002/0178034 | A1 | 11/2002 | Gardner et al. |
| 2003/0018499 | A1 | 1/2003 | Miller et al. |
| 2003/0023463 | A1 | 1/2003 | Dombroski et al. |
| 2003/0050846 | A1 * | 3/2003 | Rodon ............... G06Q 30/0625 705/26.62 |
| 2003/0055690 | A1 | 3/2003 | Garback |
| 2003/0055772 | A1 | 3/2003 | Goldstein |
| 2003/0135458 | A1 | 7/2003 | Tadano et al. |
| 2003/0177044 | A1 | 9/2003 | Sokel et al. |
| 2003/0217052 | A1 | 11/2003 | Rubenczyk et al. |
| 2004/0002876 | A1 | 1/2004 | Sommers et al. |
| 2004/0044516 | A1 | 3/2004 | Kennewick et al. |
| 2004/0078213 | A1 | 4/2004 | Brice et al. |
| 2004/0111255 | A1 | 6/2004 | Huerta et al. |
| 2004/0220854 | A1 | 11/2004 | Postrel |
| 2004/0249680 | A1 | 12/2004 | Liew et al. |
| 2005/0033614 | A1 | 2/2005 | Lettovsky et al. |
| 2005/0038644 | A1 | 2/2005 | Napper et al. |
| 2005/0043940 | A1 | 2/2005 | Elder |
| 2005/0108068 | A1 | 5/2005 | Marcken et al. |
| 2005/0220278 | A1 | 10/2005 | Zirngibl et al. |
| 2005/0267651 | A1 | 12/2005 | Arango et al. |
| 2005/0288973 | A1 | 12/2005 | Taylor et al. |
| 2006/0106655 | A1 | 5/2006 | Lettovsky et al. |
| 2006/0178931 | A1 | 8/2006 | Horn |
| 2006/0241983 | A1 | 10/2006 | Viale et al. |
| 2006/0247954 | A1 | 11/2006 | Hunt |
| 2006/0265508 | A1 | 11/2006 | Angel et al. |
| 2006/0271277 | A1 * | 11/2006 | Hu et al. ............ G01C 21/343 701/533 |
| 2006/0285662 | A1 | 12/2006 | Yin et al. |
| 2006/0293930 | A1 | 12/2006 | Rodgers et al. |
| 2007/0073562 | A1 * | 3/2007 | Brice et al. ............. G06Q 10/02 705/5 |
| 2007/0073563 | A1 | 3/2007 | Dourthe et al. |
| 2007/0100962 | A1 | 5/2007 | Barth et al. |
| 2007/0106497 | A1 | 5/2007 | Ramsey et al. |
| 2007/0106536 | A1 | 5/2007 | Moore |
| 2007/0143154 | A1 | 6/2007 | Ashby et al. |
| 2007/0156469 | A1 | 7/2007 | Bird et al. |
| 2007/0168245 | A1 | 7/2007 | de Marcken et al. |
| 2007/0174350 | A1 | 7/2007 | Pell et al. |
| 2007/0185744 | A1 * | 8/2007 | Robertson .............. G06Q 10/02 705/5 |
| 2007/0192186 | A1 | 8/2007 | Greene et al. |
| 2007/0198442 | A1 | 8/2007 | Horn |
| 2007/0203735 | A1 | 8/2007 | Ashton |
| 2007/0208503 | A1 | 9/2007 | Harnsberger |
| 2007/0260495 | A1 | 11/2007 | Mace et al. |
| 2007/0276595 | A1 | 11/2007 | Lewinson et al. |
| 2007/0294149 | A1 | 12/2007 | Lu et al. |
| 2008/0021748 | A1 | 1/2008 | Bay et al. |
| 2008/0046274 | A1 | 2/2008 | Geelen et al. |
| 2008/0052217 | A1 | 2/2008 | Etkin |
| 2008/0059454 | A1 | 3/2008 | Andrieu |
| 2008/0091525 | A1 | 4/2008 | Kretz |
| 2008/0091557 | A1 | 4/2008 | Cella et al. |
| 2008/0103949 | A1 | 5/2008 | Lobana et al. |
| 2008/0109232 | A1 | 5/2008 | Musgrove et al. |
| 2008/0114623 | A1 | 5/2008 | Berthaud et al. |
| 2008/0120306 | A1 | 5/2008 | Panabaker et al. |
| 2008/0201178 | A1 | 8/2008 | Vizitei |
| 2008/0319803 | A1 | 12/2008 | Heyraud et al. |
| 2009/0005650 | A1 | 1/2009 | Angell et al. |
| 2009/0006143 | A1 | 1/2009 | Orttung et al. |
| 2009/0048876 | A1 | 2/2009 | Bonissone et al. |
| 2009/0063359 | A1 | 3/2009 | Connors |
| 2009/0070322 | A1 | 3/2009 | Salvetti et al. |
| 2009/0112639 | A1 | 4/2009 | Robinson |
| 2009/0157312 | A1 * | 6/2009 | Black ................... G01C 21/30 701/414 |
| 2009/0157664 | A1 * | 6/2009 | Wen ...................... G06Q 10/047 707/E17.108 |
| 2009/0177651 | A1 | 7/2009 | Takamatsu et al. |
| 2009/0210262 | A1 | 8/2009 | Rines et al. |
| 2009/0216633 | A1 | 8/2009 | Whitsett et al. |
| 2009/0234681 | A1 | 9/2009 | Champernowne |
| 2009/0240517 | A1 | 9/2009 | Pelter |
| 2009/0313055 | A1 * | 12/2009 | Martin et al. .......... G06Q 10/02 705/6 |
| 2009/0319305 | A1 | 12/2009 | Weissert et al. |
| 2009/0327148 | A1 | 12/2009 | Kamar et al. |
| 2010/0010841 | A1 | 1/2010 | Cooper et al. |
| 2010/0010978 | A1 | 1/2010 | Carapella et al. |
| 2010/0030594 | A1 | 2/2010 | Swart |
| 2010/0082241 | A1 | 4/2010 | Trivedi |
| 2010/0153292 | A1 | 6/2010 | Zheng et al. |
| 2010/0217680 | A1 | 8/2010 | Fusz et al. |
| 2010/0217723 | A1 | 8/2010 | Sauerwein, Jr. et al. |
| 2010/0317420 | A1 | 12/2010 | Hoffberg |
| 2010/0318386 | A1 | 12/2010 | Vaughan et al. |
| 2010/0324927 | A1 | 12/2010 | Tinsley |
| 2011/0046989 | A1 | 2/2011 | Crean et al. |
| 2011/0093361 | A1 | 4/2011 | Morales |
| 2011/0125578 | A1 | 5/2011 | Alspector et al. |

(56) References Cited

U.S. PATENT DOCUMENTS

| | | |
|---|---|---|
| 2011/0137766 A1 | 6/2011 | Rasmussen et al. |
| 2011/0153373 A1 | 6/2011 | Dantzig et al. |
| 2011/0167003 A1 | 7/2011 | Nice et al. |
| 2011/0231182 A1 | 9/2011 | Weider et al. |
| 2011/0246246 A1* | 10/2011 | Johnson ............... G06Q 50/14 705/5 |
| 2011/0295692 A1 | 12/2011 | Zivkovic et al. |
| 2011/0307241 A1 | 12/2011 | Waibel et al. |
| 2011/0307280 A1 | 12/2011 | Mandelbaum |
| 2011/0312870 A1 | 12/2011 | Beatty |
| 2012/0036158 A1 | 2/2012 | Cahill et al. |
| 2012/0054001 A1 | 3/2012 | Zivkovic et al. |
| 2012/0059679 A1 | 3/2012 | de Marcken et al. |
| 2012/0209517 A1 | 8/2012 | Li et al. |
| 2012/0233207 A1 | 9/2012 | Mohajer |
| 2012/0239440 A1 | 9/2012 | Miller et al. |
| 2012/0239443 A1 | 9/2012 | Miller et al. |
| 2012/0239455 A1 | 9/2012 | Crean et al. |
| 2012/0239584 A1 | 9/2012 | Yariv et al. |
| 2012/0239669 A1 | 9/2012 | Miller et al. |
| 2012/0259667 A1 | 10/2012 | Pelissier et al. |
| 2012/0265598 A1 | 10/2012 | Krone |
| 2012/0330982 A1 | 12/2012 | Arnaud et al. |
| 2013/0166329 A1 | 1/2013 | Arnoux-Prost et al. |
| 2013/0041696 A1 | 2/2013 | Richard |
| 2013/0041902 A1 | 2/2013 | Swann et al. |
| 2013/0054375 A1 | 2/2013 | Sy et al. |
| 2013/0073323 A1 | 3/2013 | Zacharia et al. |
| 2013/0073325 A1 | 3/2013 | Ross |
| 2013/0090959 A1 | 4/2013 | Kvamme et al. |
| 2013/0096965 A1 | 4/2013 | Pappas et al. |
| 2013/0132129 A1 | 5/2013 | Fox et al. |
| 2013/0151291 A1* | 6/2013 | Salway ................. G06Q 10/02 705/5 |
| 2013/0158821 A1 | 6/2013 | Ricci |
| 2013/0159023 A1 | 6/2013 | Srinivas et al. |
| 2013/0198036 A1 | 8/2013 | Pappas et al. |
| 2013/0261957 A1* | 10/2013 | Mahapatro et al. . G06Q 10/047 701/426 |
| 2013/0304349 A1 | 11/2013 | Davidson |
| 2013/0339105 A1 | 12/2013 | Russell et al. |
| 2014/0012659 A1 | 1/2014 | Yan |
| 2014/0019176 A1* | 1/2014 | Mandelbaum ....... G06Q 10/025 705/6 |
| 2014/0025540 A1 | 1/2014 | Hendrickson |
| 2014/0074746 A1 | 3/2014 | Wang |
| 2014/0081793 A1 | 3/2014 | Hoffberg |
| 2014/0089020 A1 | 3/2014 | Murphy |
| 2014/0089036 A1 | 3/2014 | Chidlovskii |
| 2014/0089101 A1 | 3/2014 | Meller |
| 2014/0114705 A1* | 4/2014 | Bashvitz .............. G06Q 10/047 705/5 |
| 2014/0156411 A1 | 6/2014 | Murgai |
| 2014/0229102 A1* | 8/2014 | Bapna ................. G06Q 10/025 701/537 |
| 2014/0257949 A1 | 9/2014 | Gishen |
| 2014/0279196 A1* | 9/2014 | Wilson ............... G06Q 30/0631 705/26.7 |
| 2014/0304014 A1* | 10/2014 | Lee et al. ............... G06Q 10/02 705/5 |
| 2014/0330605 A1 | 11/2014 | Connolly et al. |
| 2014/0330606 A1 | 11/2014 | Paget et al. |
| 2014/0330621 A1 | 11/2014 | Nichols et al. |
| 2014/0337063 A1 | 11/2014 | Nelson et al. |
| 2015/0012309 A1 | 1/2015 | Buchheim et al. |
| 2015/0012467 A1 | 1/2015 | Greystoke et al. |
| 2015/0046201 A1 | 2/2015 | Miller et al. |
| 2015/0066594 A1 | 3/2015 | Li et al. |
| 2015/0066830 A1 | 3/2015 | Wilson et al. |
| 2015/0168169 A1 | 6/2015 | Caceres et al. |
| 2015/0193583 A1 | 7/2015 | McNair et al. |
| 2015/0227633 A1 | 8/2015 | Shapira |
| 2015/0235478 A1 | 8/2015 | Blandin et al. |
| 2015/0242927 A1 | 8/2015 | Will et al. |
| 2015/0278970 A1 | 10/2015 | Valverde, Jr. et al. |
| 2015/0356262 A1 | 12/2015 | Liebovitz et al. |
| 2016/0048928 A1 | 2/2016 | Davis et al. |
| 2016/0125559 A1* | 5/2016 | Shekou ................ G01C 21/343 705/6 |
| 2016/0162871 A1 | 6/2016 | Lee |
| 2016/0196271 A1 | 7/2016 | Miller et al. |
| 2016/0202073 A1 | 7/2016 | Claycomb et al. |
| 2016/0203422 A1 | 7/2016 | Demarchi et al. |
| 2016/0232626 A1 | 8/2016 | Geraci et al. |
| 2016/0258767 A1 | 9/2016 | Nevrekar et al. |
| 2016/0364815 A1 | 12/2016 | Miller et al. |
| 2016/0371799 A1 | 12/2016 | Miller et al. |
| 2017/0316103 A1 | 11/2017 | Miller et al. |
| 2019/0012712 A1 | 1/2019 | Miller et al. |
| 2019/0179863 A1 | 6/2019 | Miller et al. |
| 2019/0251643 A1 | 8/2019 | Valverde, Jr. et al. |
| 2019/0332921 A1 | 10/2019 | Rodriguez |
| 2020/0027039 A1 | 1/2020 | Miller et al. |

OTHER PUBLICATIONS

Non-Final Office Action and Notice of References Cited dated Sep. 16, 2019 in U.S. Appl. No. 16/055,767 (7 pages).

Final Office Action and Notice of References Cited dated Apr. 18, 2017 in U.S. Appl. No. 14/453,420 (27 pages).

Non-Final Office Action dated Mar. 9, 2018 in U.S. Appl. No. 14/453,420 (38 pages).

Final Office Action and Notice of References Cited dated Aug. 27, 2018 in U.S. Appl. No. 14/453,420 (45 pages).

Non-Final Office Action and Notice of References Cited dated Jan. 7, 2019 in U.S. Appl. No. 14/453,420 (47 pages).

Final Office Action and Notice of References Cited dated Mar. 29, 2019 in U.S. Appl. No. 14/453,420 (44 pages).

Non-Final Office Action and Notice of References Cited dated Jul. 12, 2018 in U.S. Appl. No. 15/183,620 (14 pages).

Non-Final Office Action and Notice of References Cited dated Nov. 29, 2018 in U.S. Appl. No. 15/183,620 (17 pages).

Non-Final Office Action and Notice of References Cited dated May 22, 2019 in U.S. Appl. No. 15/183,620 (16 pages).

Non-Final Office Action and Notice of References Cited dated Apr. 17, 2019 in U.S. Appl. No. 15/482,619 (42 pages).

Non-Final Office Action and Notice of References Cited dated Apr. 14, 2020 in U.S. Appl. No. 15/979,275 (14 pages).

Non-Final Office Action and Notice of References Cited dated May 28, 2020 in U.S. Appl. No. 16/142,834 (33 pages).

Examiner's Report dated Feb. 26, 2016 in CA Patent Application No. 2,830,228 (3 pages).

Notice of Allowance dated Jan. 12, 2017 in CA Patent Application No. 2,830,228 (1 page).

Notice of Allowance dated May 4, 2017 in CA Patent Application No. 2,830,224 (1 page).

Final Office Action and Notice of References Cited dated Jun. 10, 2020 in U.S. Appl. No. 15/178,064 (42 pages).

Final Office Action and Notice of References Cited dated Oct. 23, 2020 in U.S. Appl. No. 14/750,841 (21 pages).

Notice of Allowance and References Cited in U.S. Appl. No. 14/750,841, dated Mar. 23, 2021 (12 pages).

PR Newswire, "GetGoing Launches Multi-Supplier Hotel Merchandising Platform: BCD Travel Signs Multi-Year Agreement to Streamline Hotel Booking for Travel Management Companies", New York, PR Newswire Association LLC, Sep. 23, 2014 (2-3 pages).

International Search Report and Written Opinion dated Jun. 15, 2012 in International Patent Application No. PCT/US2012/029121 (8 pages).

International Search Report and Written Opinion dated Jun. 7, 2012 in International Patent Application No. PCT/US2012/029098 (6 pages).

International Search Report and Written Opinion dated Mar. 14, 2013 in International Patent Application No. PCT/US2012/029112 (6 pages).

International Search Report and Written Opinion dated Nov. 24, 2014 in International Patent Application No. PCT/US2014/049979 (8 pages).

(56) References Cited

OTHER PUBLICATIONS

United Hub, "FareLock: An Opportunity to Lock in Your Ticket Price for up to Seven Days", Jul. 28, 2012 <https://web.archive.org/web/20120728071904/https://www.united.com/CMS/en-US/praducts/travelproducts/Pages/FareLock.aspx>, Aug. 17, 2012 <https://hub.united.com/en-us/news/products-services/pages/farelock-lets-you-lock-in-your-ticket-price.aspx> (3 pages).
MacKenzie, "Two Services Help You Lock in a Good Deal on Airfare", Hack My Trip, Apr. 2014 <http://hackmytrip.com/2014/04/two-services-help-lock-good-deal-airfare> (9 pages).
Boardman, "Options Away", Vimeo, May 24, 2013 <http://vimeo.com/66936261> (2 pages).
International Search Report and Written Opinion dated Jul. 2, 2015 in International Patent Application No. PCT/US2015/023901 (8 pages).
Examiner's Report dated May 18, 2016 in CA Patent Application No. 2,830,224 (6 pages).
Examiner's Report dated May 19, 2016 in CA Patent Application No. 2,830,229 (4 pages).
International Search Report and Written Opinion dated Jul. 11, 2016 in International Patent Application No. PCT/US2016/037555 (12 pages).
International Search Report and Written Opinion dated Sep. 1, 2016 in International Patent Application No. PCT/US2016/036760 (8 pages).
International Search Report and Written Opinion dated Sep. 9, 2016 in International Patent Application No. PCT/US2016/037503 (6 pages).
International Search Report and Written Opinion dated Sep. 27, 2016 in International Patent Application No. PCT/US2016/036749 (6 pages).
Examiner's Report dated Apr. 28, 2017 in CA Patent Application No. 2,830,229 (4 pages).
International Search Report and Written Opinion dated Jul. 7, 2017 in International Patent Application No. PCT/US2017/026708 (8 pages).
Mayerowitz, "Latest Airline Fee: $9 to Lock in Airfare", ABC News [online], Dec. 13, 2010 <http://web.archive.org/web/20110122133909/http://abcnews.go.com/Travel/airline-fees-forget-checked-bags-pay-lock-airfare/story?id=12385126> (p. 1) and Dec. 18, 2010 <http://web.archive.org/web/20101218074131/http://abcnews.go.com:80/Travel/airline-fees-forget-checked-bags-pay-lock-airfare/story?id=12385126&page=2 (p. 2), total 8 pages.
Examiner's Report dated Mar. 16, 2018 in CA Patent Application No. 2,830,229 (5 pages).
Goddeau, et al., "Galaxy: A Human-Language Interface to On-Line Travel Information", 3rd International Conference on Spoken Language Processing (ICSLP94), Yokohama, Japan, Sep. 18-22, 1994, pp. 707-710.
Subramoni, "Topology-Aware MPI Communication and Scheduling for High Performance Computing Systems", Ohio State University, 2013, 151 pages.
Tablan et al., "A Natural Language Query Interface to Structured Information", The Semantic Web: Research and Applications, ESWC 2008: Lecture Notes in Computer Science, vol. 5021, pp. 361-375.
United Airlines, "FareLock", webpage, Jul. 28, 2012 <https://www.united.com/CMS/en-US/products/travel/products/Pages/FareLock.aspx> (4 pages).
Federal Trade Commission, "Using Layaway Plans", webpage, Dec. 19, 2012 <http://web.archive.org/web/20121219044435/https://www.consumer.ftc.gov/articles/0128-using-layaway-plans> (2 pages).
Examiner's Report dated Feb. 27, 2019 in CA Patent Application No. 2,944,652 (5 pages).
Examiner's Report dated Mar. 1, 2019 in CA Patent Application No. 2,830,229 (3 pages).
Examiner's Report dated Jun. 3, 2019 in CA Patent Application No. 3,021,147 (5 pages).
Examiner's Report dated Jul. 26, 2019 in CA Patent Application No. 2,989,325 (6 pages).
Non-Final Office Action and Notice of References Cited dated Jun. 5, 2018 in U.S. Appl. No. 15/595,795 (14 pages).
Non-Final Office Action and Notice of References Cited dated Mar. 11, 2015 in U.S. Appl. No. 13/420,433 (9 pages).
Non-Final Office Action and Notice of References Cited dated Feb. 26, 2016 in U.S. Appl. No. 13/420,433 (11 pages).
Non-Final Office Action and Notice of References Cited dated Dec. 16, 2013 in U.S. Appl. No. 13/419,989 (16 pages).
Non-Final Office Action and Notice of References Cited dated Dec. 5, 2014 in U.S. Appl. No. 13/419,989 (14 pages).
Notices of Allowance and References Cited dated Dec. 18, 2015 in U.S. Appl. No. 13/419,989 (15 pages).
Non-final Office Action and Notice of References Cited dated Oct. 21, 2014 in U.S. Appl. No. 13/420,179 (10 pages).
Non-final Office Action and Notice of References Cited dated Aug. 12, 2015 in U.S. Appl. No. 14/750,841 (15 pages).
Non-final Office Action and Notice of References Cited dated Aug. 14, 2015 in U.S. Appl. No. 14/676,302 (19 pages).
Final Office Action and Notice of References Cited dated Apr. 6, 2016 in U.S. Appl. No. 14/676,302 (26 pages).
Final Office Action and Notice of References Cited dated Jul. 11, 2016 in U.S. Appl. No. 13/420,433 (12 pages).
Non-final Office Action and Notice of References Cited dated Sep. 20, 2016 in U.S. Appl. No. 14/453,420 (29 pages).
Non-final Office Action and Notice of References Cited dated Nov. 30, 2016 in U.S. Appl. No. 14/676,302 (20 pages).
Non-final Office Action and Notice of References Cited dated Dec. 29, 2016 in U.S. Appl. No. 14/750,841 (16 pages).
Non-final Office Action and Notice of References Cited dated Jul. 13, 2016 in U.S. Appl. No. 15/069,791 (12 pages).
Non-final Office Action and Notice of References Cited dated Jun. 22, 2016 in U.S. Appl. No. 13/420,179 (13 pages).
Notices of Allowance and References Cited dated Dec. 27, 2018 in U.S. Appl. No. 13/420,179 (13 pages).
Non-final Office Action and Notice of References Cited dated Apr. 24, 2018 in U.S. Appl. No. 14/676,302 (26 pages).
Non-final Office Action and Notice of References Cited dated Feb. 7, 2019 in U.S. Appl. No. 14/750,841 (18 pages).
Non-final Office Action and Notice of References Cited dated Mar. 13, 2020 in U.S. Appl. No. 14/750,841 (25 pages).
Non-final Office Action and Notice of References Cited dated Aug. 24, 2018 in U.S. Appl. No. 15/178,064 (30 pages).
Final Office Action and Notice of References Cited dated Feb. 19, 2019 in U.S. Appl. No. 15/178,064 (33 pages).
Non-final Office Action and Notice of References Cited dated Oct. 7, 2019 in U.S. Appl. No. 15/178,064 (44 pages).
Notices of Allowance and References Cited dated Jul. 9, 2021 in U.S. Appl. No. 16/275,133 (12 pages).

\* cited by examiner

SCORING SYSTEM FOR TRAVEL PLANNING

CROSS-REFERENCE TO RELATED APPLICATION

The present utility patent application is a continuation of, and claims the priority benefit of U.S. patent application Ser. No. 16/055,767 filed on Aug. 6, 2018 and entitled "Scoring System for Travel Planning," which is a continuation of, and claims the priority benefit of U.S. patent application Ser. No. 15/178,453 filed on Jun. 9, 2016 and entitled "Scoring System for Travel Planning". U.S. patent application Ser. No. 15/178,453 in turn claims the priority benefit of U.S. Provisional Application No. 62/181,664, filed on Jun. 18, 2015, and entitled "Scoring System for Travel Planning." The disclosures of the above-referenced applications are incorporated herein by reference for all purposes to the extent that such subject matter is not inconsistent herewith or limiting thereof.

TECHNICAL FIELD

The present disclosure relates to data processing and, more particularly, to facilitating travel reservations.

BACKGROUND

A travel consumer can conventionally enjoy the benefits of a diversity of choices: a marketplace that is replete with purchase options; numerous information sources that provide travel-related information and advice on everything from destinations to hotels and related points-of-interest; and finally, a reasonable degree of price transparency on a vast array of travel-related goods and services. While consumers derive much utility from this choice environment—enabled by online travel agencies (OTAs) and travel websites—the fact remains that the travel consumer is often encumbered by information abundance and by legacy technology platforms that almost invariably complicate the consumer's choice. For an average consumer, these choice-related challenges take many forms, such as a plurality of travel-related goals and objectives pertaining to all of the relevant facets and phases of the travel planning process; the existence of a large number of viable itinerary options to sort through, evaluate, and ultimately choose from; the existence of disparate and non-homogenous information sources, all of which possess varying degrees of quality, usefulness, and reliability; and the need to consider complex value trade-offs among key choice attributes and objectives (e.g., price vs. suitability of a selected flight for the consumer), together with the existence of often conflicting objectives (e.g., a desire for luxury, constrained by willingness-to-pay).

Empirical studies reveal that travelers are more likely to rely on advice and recommendations of friends, relatives, colleagues, and so forth than other information sources. Conventionally, the traveler can review the recommendations of friends by intentionally searching for them, for example, on a social network page of a friend or on a profile page of the friend on a travel website. However, the conventional OTAs do not take the recommendations of friends of the traveler into consideration when searching and presenting feasible travel itineraries to the traveler.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one example embodiment of the disclosure, a method for facilitating travel reservations is provided. The method may commence with receiving a travel-related query from a user. The method may continue with parsing the travel-related query to derive at least one attribute related to the travel-related query. The travel-related query may include a natural language query. One or more further users may be selected by comparing the at least one attribute of the user with attributes of the one or more further users. The attributes of the one or more further users may match the at least one attribute of the user. The at least one attribute of the user may be ranked based on preference data of the one or more further users. Weights may be assigned to the at least one attribute based on the ranking to create at least one weighted attribute. The method may continue with searching for feasible travel itineraries based on the at least one attribute. Based on the at least one weighted attribute, the feasible travel itineraries may be scored. At least one travel itinerary selected from the feasible travel itineraries may be presented based on the scoring.

According to another example embodiment of the disclosure, a system for facilitating travel reservations is provided. The system may include a processor, a parser in communication with the processor, and a scheduler in communication with the processor. The processor may be operable to receive a travel-related query from a user. The parser may be operable to parse the travel-related query to derive the at least one attribute related to the travel-related query. The processor may be further operable to select one or more further users by comparing at least one attribute of the user with attributes of the one or more further users. The one or more further users may be selected when the attributes of the one or more further users match the at least one attribute of the user. Upon the selection of the one or more further users, the processor may rank the at least one attribute of the user based on preference data of the one or more further users. The processor may be further operable to assign weights to the at least one attribute based on the ranking to create at least one weighted attribute. The scheduler may be operable to search for the feasible travel itineraries based on the at least one attribute. Upon the search, the processor may be operable to score feasible travel itineraries based on the at least one weighted attribute. The processor may further present at least one travel itinerary selected from the feasible travel itineraries based on the scoring.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The disclosure relates to facilitating travel reservations by accommodating and managing specific types of preference information, namely, ratings, recommendations, and (more generally) reviews of registered users of their travel experiences. More specifically, upon receiving a travel-related query from a user, a system for facilitating travel reservations may analyze the travel-related query to determine attributes related to the travel-related query. The system may further compare the attributes of the user with attributes of further users of the systems. The further users whose attributes match the attributes of the user may be selected. The system may search for feasible travel itineraries based on the travel-related query. Upon the search, the system may use preference data of the further users related to the travel itineraries, such as ratings, recommendations, and reviews, to score the feasible travel itineraries. The travel itineraries having the highest scores may be presented to the user.

Figure 1:
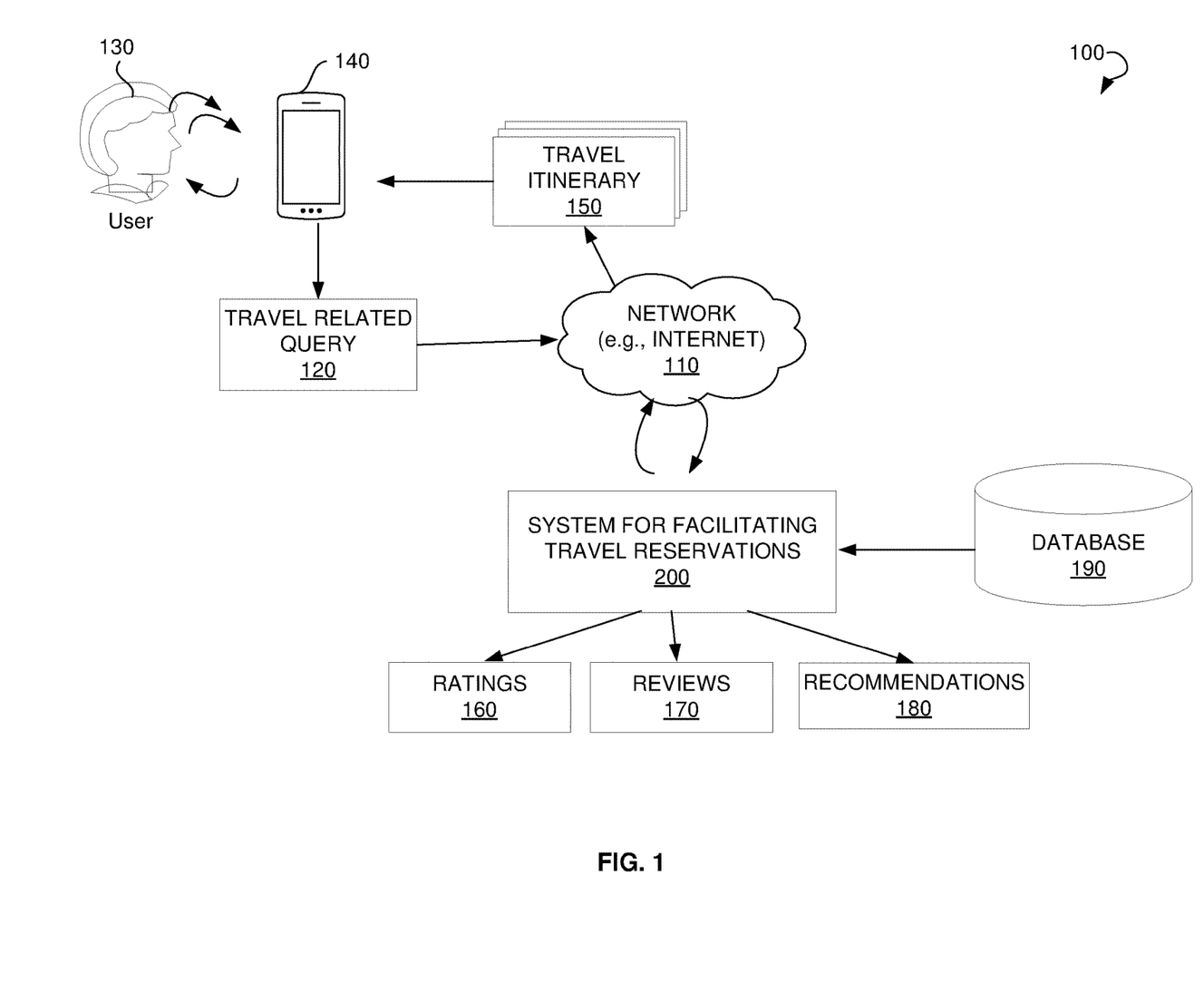
FIG. 1 illustrates an environment within which systems and methods for facilitating travel reservations can be implemented.

FIG. 1 illustrates an environment 100 within which systems and methods for facilitating travel reservations can be implemented, in accordance with some embodiments. A travel-related query 120 of a user 130 may be received, for example, via a user interface displayed on a user device 140. The travel-related query 120 may include text data. The text data may be obtained as a natural language input by the user, by speech-to-text conversion of an oral exchange with the user, or otherwise. In some embodiments, to motivate the user 130 to provide the travel-related query 120, the user 130 may be asked, orally, one or more motivating questions.

The travel-related query 120 may be transmitted to a system 200 for facilitating travel reservations via a network 110. The network 110 may include the Internet or any other network capable of communicating data between devices. Suitable networks may include or interface with any one or more of, for instance, a local intranet, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34b is analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, BLUETOOTH radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a Small Computer Systems Interface connection, a Universal Serial Bus connection or other wired or wireless, digital or analog interface or connection, mesh or Digi® networking. The network 110 may be a network of data processing nodes that are interconnected for the purpose of data communication. The network 110 may include any suitable number and type of devices (e.g., routers and switches) for forwarding commands, content, and/or web object requests from each user and responses back to the users.

The user device 140, in some example embodiments, may include a Graphical User Interface for displaying the user interface associated with the system 200. The user device 140 may include a mobile telephone, a personal computer (PC), a laptop, a smart phone, a tablet PC, and so forth. The system 200 may include a server-based distributed application; thus, the system 200 may include a central component residing on a server and one or more client applications residing on one or more user devices, such as the user device 140, and communicating with the central component via the network 110. The user 130 may communicate with the system 200 via a client application available through the user device 140.

Travel itineraries available, for example, from a database 190 may be analyzed based on preference data of the one or more further users. The system 200 may use preference data of the further users related to the travel itineraries, such as ratings 160, reviews 170, and recommendations 180, to score feasible travel itineraries found for the user 130 based on the travel-related query 120. Based on the scoring, at least one travel itinerary 150 may be presented to the user 130 by displaying the travel itinerary 150 via the user interface on a screen of the user device 140.

Figure 2:
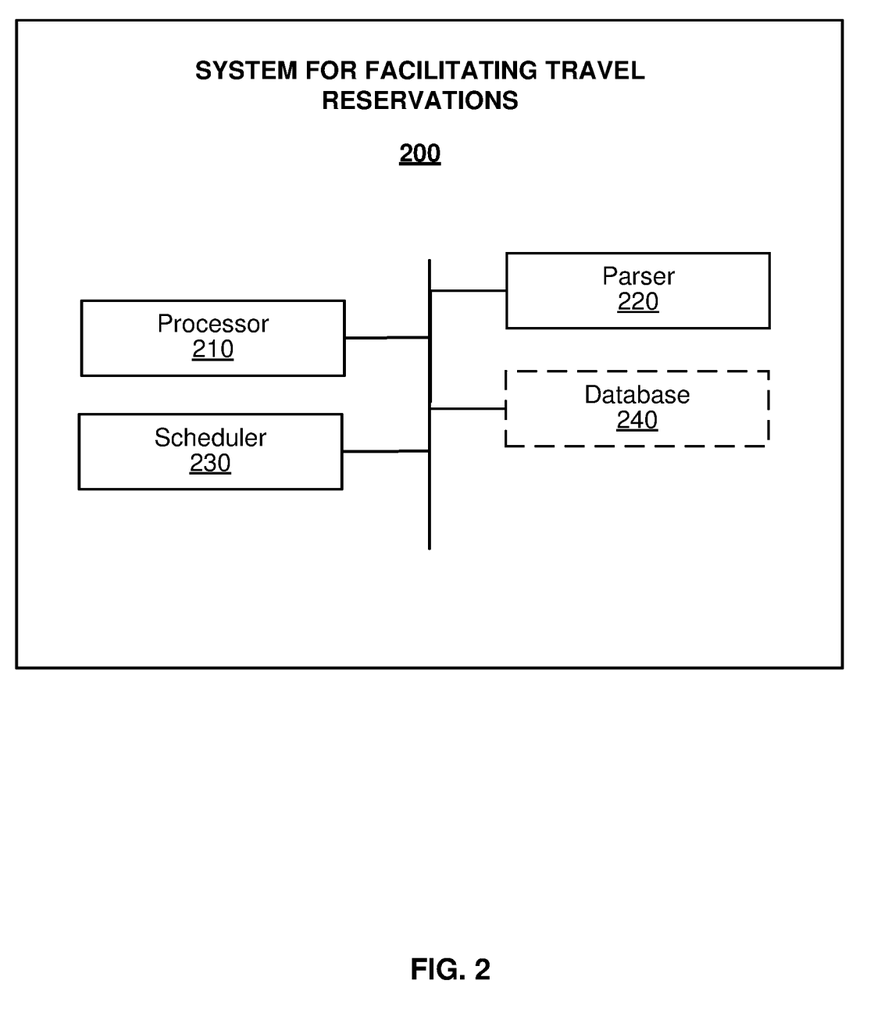
FIG. 2 is block diagram showing various modules of a system for facilitating travel reservations.

FIG. 2 is a block diagram showing various modules of a system 200 for facilitating travel reservations, in accordance with certain embodiments. The system 200 may comprise a processor 210, a parser 220, a scheduler 230, and an optional database 240. The processor 210 may include a programmable processor, such as a microcontroller, central processing unit (CPU), and so forth. In other embodiments, the processor 210 may include an application-specific integrated circuit or programmable logic array, such as a field programmable gate array, designed to implement the functions performed by the system 200.

The processor 210 may be operable to receive a travel related query. The travel related query may be provided by a user, also referred to as a traveler. Moreover, the travel related query may be provided using a natural language, a typed text, a selection of preexisting options, and so forth. The system 200 may be both goal and preference driven. At a foundational level, consumer strategic intent may lie at the center of all travel planning actions and travel-related consumption. Accordingly, the system 200 may be designed to understand the travel-related query (stated in natural language, via voice or text) in terms of the determinate goals and objectives of a traveler, and to schedule travel itineraries—comprised of flights, hotel accommodations, car rental reservations, and so forth—that are both feasible and sensible. In order to achieve this functionality, the system 200 may require, for example, three informational elements, such as an understanding of origin(s) and desired destination (s) for respective travelers; desired date(s) and time(s) of travel; and consideration of relevant preferences (pertaining to, e.g., flight-related preferences, hotel-related preferences, and so forth). The third element—the consideration of relevant consumer preferences—may factor into how travel-related queries are serviced and customized within the system 200. Therefore, the parser 220 of the system 200 may be operable to parse the travel-related query to derive at least one attribute related to the travel-related query. The attribute sets may include, for example, an origin city, a destination city, a date of travel, time of travel, a hotel, a car reservation, and so forth.

The system 200 may incorporate a choice architecture (CA) provided to customize the itinerary creation and selection process, and to provide the traveler with the best possible travel buying experience. The construction of a requisite CA requires an awareness and understanding of the factors that drive or otherwise influence traveler choice in the travel space. At a foundational level, preferences and desires are what ultimately drive these choices, and the system 200 may therefore incorporate a number of preference representations and preference learning elements.

Much of how preferences are both modeled and managed in the system 200 may be predicated on a specific set of views as to the nature of travel-related preferences. The central preference-related tenets of the system 200 can be summarized as follows:

Travel preferences are constructed as opposed to revealed;

Travel preferences are context-dependent, and choices among travel-related options are also context-dependent;

The relative value of a travel option depends not just on the characteristics of that option, but also on the characteristics of the other options in the choice set;

Travel consumers often bring a plurality of goals and objectives to their purchase decisions.

Ratings and recommendations of travelers may constitute an important class of preference-based information that is both captured and utilized within the system 200. More specifically, since the system 200 may be a fully functioning e-commerce platform, the system 200 may have a wealth of transactional data that may be accumulated from use of the system 200 by registered travelers to book travel itineraries. Within the system 200, each transaction may be logged, together with the travel-related query (and the instantiated attributes for each travel-related query) that gave rise to the itinerary purchase decision. Any relevant feedback from the users in the form of ratings or recommendations may be conjoined with each transaction data log.

The processor 210 may be operable to compare at least one attribute of the user with attributes of the one or more further users. If a match of the attributes of the one or more further users and the at least one attribute of the user is found, the processor 210 may select one or more further users.

In a further example embodiment, the processor 210 may be further operable to combine the one or more further users into a subset based on the attributes of the one or more further users. In this case, the user may select the subset of users, from which the one or more further users are to be selected. Therefore, in this embodiment, the selection of the one or more further users may include selection of the one or more further users from the subset. In an example embodiment, within the system 200, users can avail themselves of ratings information and/or recommendations that are community-based, drawn from relevant pools or subsets of the registered user-base for the platform. Each registered user can define one or more "communities" from which to draw ratings/recommendation information. The user can construct "communities" (or even "meta-" or "hybrid-communities" that combine two or more predefined community groups, using aggregation methods whose parameters are customizable by the user) that are comprised of individuals that share similar socio-demographic identifiers (e.g., age, gender, education, and so forth), interests, destinations, hobbies, and so forth.

Additionally, the system 200 can enable users to identify some users of the system 200 as "friends." Ratings/recommendations of users marked as "friends" may factor into itinerary creation and selection process for the user.

The system 200 can implement a number of algorithms and analytic frameworks that can enable the ratings and recommendations to be used for both predictive and prescriptive analytic purposes. Central in this regard are knowledge-based methods that invoke domain knowledge and expertise about how platform-based content may potentially meet the explicit (or implicit or inferred) needs/preferences of the consumer. Natural language examples of these types of search queries include:

"I am going to Vegas; where do people like me usually stay?"

"Where do my friends stay when they go to Malibu?"

"I am looking for hotels in NYC with a nearby park to run in . . . "

Upon the selection of the one or more further users, whose attributes match the at least one attribute of the user, the processor 210 may be operable to rank the at least one attribute of the user based on preference data of the one or more further users. The preference data of the one or more further users may include one or more of the following: ratings associated with travel itineraries, recommendations associated with travel itineraries, reviews associated with travel itineraries, and so forth. The preference data of the one or more further users may be received from the optional database 240. The processor 210 may be operable to assign weights to the at least one attribute of the user based on the ranking to create at least one weighted attribute.

In an example embodiment, to the extent that a user wants to utilize ratings/reviews/recommendations from information sources that are external to the system 200 (e.g., from a third-party organization), the system 200 may enable the user to construct composite scores or indices for the ratings/reviews/recommendations from third-party organizations, which can also be brought into the itinerary search, evaluation, and booking process. More specifically, the scheduler 230 may be operable to search for feasible travel itineraries based on the at least one attribute. When the feasible travel itineraries are found by the scheduler 230, the processor 210 may be operable to score the feasible travel itineraries based on the at least one weighted attribute. In an example embodiment, within the CA, scoring can be based, in part, on the users who actually booked a stay at a particular hotel via the system 200, or flew a particular route on a particular airline.

Upon scoring, the processor 210 may select at least one travel itinerary from the feasible travel itineraries based on the scoring and present a selected travel itinerary to the user on the user device.

Moreover, the users may be able to assign their own (subjectively assigned) measures of "trust" or "confidence" in each individual information source (e.g., "my confidence in the ratings from HOTELS.COM is 70%, whereas for TRIPADVISOR.COM, my confidence is only 30%"). Additionally, the processor 210 may be further configured to receive a setting of a trust level for the one or more further users from the user. In this case, the ranking of the at least one attribute of the user may be further based on the trust level of the one or more further users. More specifically, the results of the itinerary creation and selection process for the user can be further refined by specifying trust/credence/veracity levels for members of a group or sub-group (for example, members of the subset).

In an example embodiment, the processor 210 may be further operable to receive a selection of one or more identifiers from the user. The one or more identifiers may include one or more of the following: a gender, an age, an education, interests, a hobby, and so forth. Based on the one or more identifiers, the processor 210 may combine the one or more further users into a subset.

In a further example embodiment, the processor 210 may be further configured to receive a selection of at least one further user marked as a friend from the user. In this embodiment, the ranking of the at least one attribute of the user may be further based on preference data of the at least one further user.

Additionally, the processor 210 may be further operable to receive a feedback associated with the at least one travel itinerary from the user. The feedback may include one or more of the following: a rating associated with the at least one travel itinerary, a recommendation associated with the at least one travel itinerary, a review associated with the at least one travel itinerary, and so forth. The user may provide the feedback after the user has actually booked a stay at a particular hotel, flew a particular route on a particular airline, and the like.

In an example embodiment, all users of the system 200 may be provided with the instrumental means by which the users may convey their preferences and needs. Moreover, the users may be allowed to customize how their ratings are encoded/represented (with concomitant trade-offs regarding assessment effort versus information content/quality), and how the information is utilized within the CA for customizing travel itineraries. More broadly, the users of the system 200 may have an option of specifying how their behavioral usage data (e.g., browsing/search patterns and so forth) are utilized within the system 200 as a whole. More specifically, the behavioral usage data, travel-related queries, and instantiated attributes associated with the travel-related queries may be stored in the optional database 240. In an example embodiment, the user can choose a privacy mode of interaction with the system 200 where no behavioral usage data may be stored to the optional database 240 or used by the system 200 for customizing travel itineraries.

Figure 3:
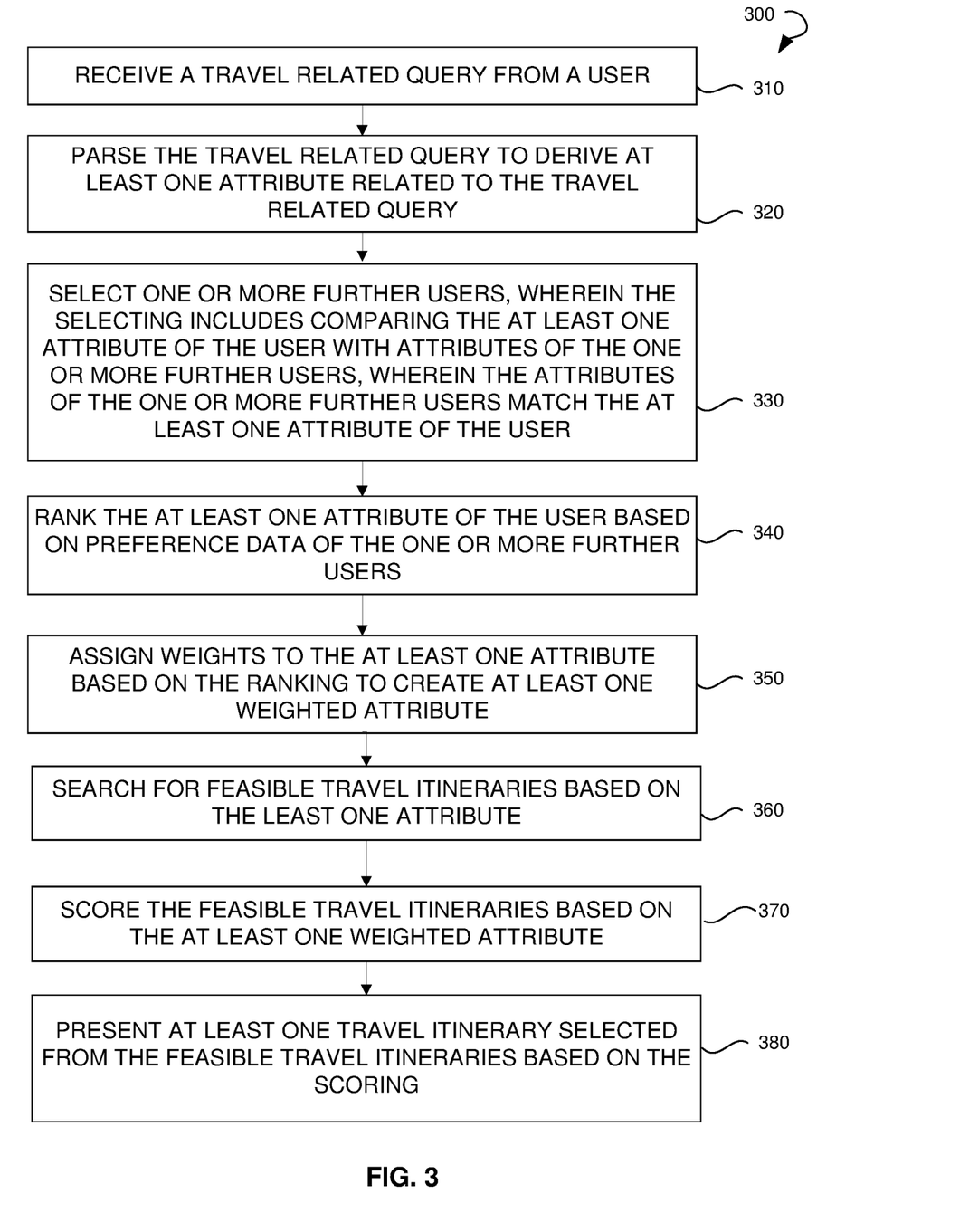
FIG. 3 is a process flow diagram showing a method for facilitating travel reservations.

FIG. 3 is a process flow diagram showing a method 300 for facilitating travel reservations within the environment described with reference to FIG. 1. The method 300 may commence with receiving a travel-related query from a user at operation 310. In an example embodiment, the travel-related query may include one or more of the following: a natural language query, a typed text query, a selection of preexisting options, and so forth. The method 300 may continue with parsing the travel-related query to derive at least one attribute related to the travel-related query at operation 320. At operation 330, one or more further users may be selected by comparing the at least one attribute of the user with attributes of the one or more further users. The attributes of the one or more further users may match the at least one attribute of the user. The at least one attribute of the user may be ranked based on preference data of the one or more further users at operation 340. In some embodiments, the preference data of the one or more further users may include one or more of the following: ratings associated with travel itineraries, recommendations associated with travel itineraries, reviews associated with travel itineraries, and so forth.

At operation 350, weights may be assigned to the at least one attribute based on the ranking to create at least one weighted attribute. The method 300 may continue with operation 360, at which feasible travel itineraries may be searched based on the least one attribute. Based on the at least one weighted attribute, the feasible travel itineraries may be scored at operation 370. The method 300 may further include presenting at least one travel itinerary to the user at operation 380. The at least one travel itinerary presented to the user may be selected from the feasible travel itineraries based on the scoring.

The method 300 may further optionally include receiving a feedback associated with at least one travel itinerary from the user. The feedback may include one or more of the following: a rating associated with the at least one travel itinerary, a recommendation associated with the at least one travel itinerary, a review associated with the at least one travel itinerary, and so forth. The feedback may be stored to a database and used for selection of travel itinerates in response to further travel-related queries.

In a further example embodiment, the method 300 may optionally include combining the one or more further users into a subset based on the attributes of the one or more further users. A selection of the subset may be received from the user. In this embodiment, the selection of the one or more further users may include selecting the one or more further users from the subset.

The method 300 may further optionally include receiving a selection of one or more identifiers from the user and combining the one or more further users into a subset based on the one or more identifiers. The one or more identifiers include one or more of the following: a gender, an age, an education, interests, a hobby, and so forth.

In a further example embodiment, the method 300 may optionally include receiving from the user a selection of at least one further user marked as a friend. In this embodiment, the ranking may include ranking of the at least one attribute of the user based on preference data of the at least one further user marked as a friend.

The method 300 may further optionally include receiving, from the user a setting of a trust level for the one or more further users. In this embodiment, the ranking of the at least one attribute of the user may be further based on the trust level of the one or more further users.

Figure 4:
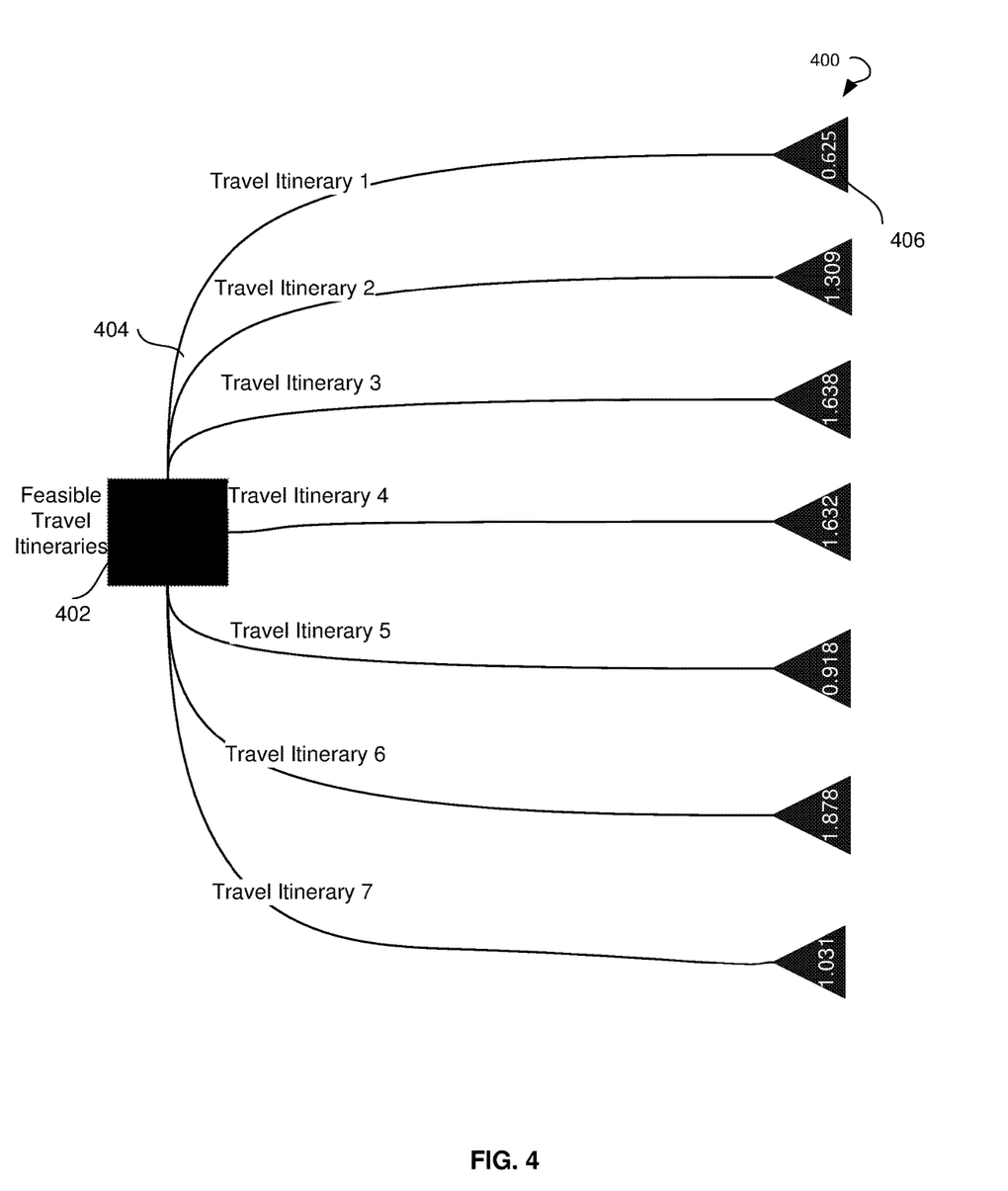
FIG. 4 is a schematic diagram of travel itineraries found by a system for facilitating travel reservations.

FIG. 4 shows a schematic diagram 400 of travel itineraries found by a scheduler of the system for facilitating travel reservations. In particular, the scheduler may perform the search in feasible travel itineraries 402. As a result of the search, travel itineraries 1-7 shown as travel itineraries 404 may be found. Each of the travel itineraries 404 may have weights 406 assigned based on preference data of one or more further users.

Figure 5:
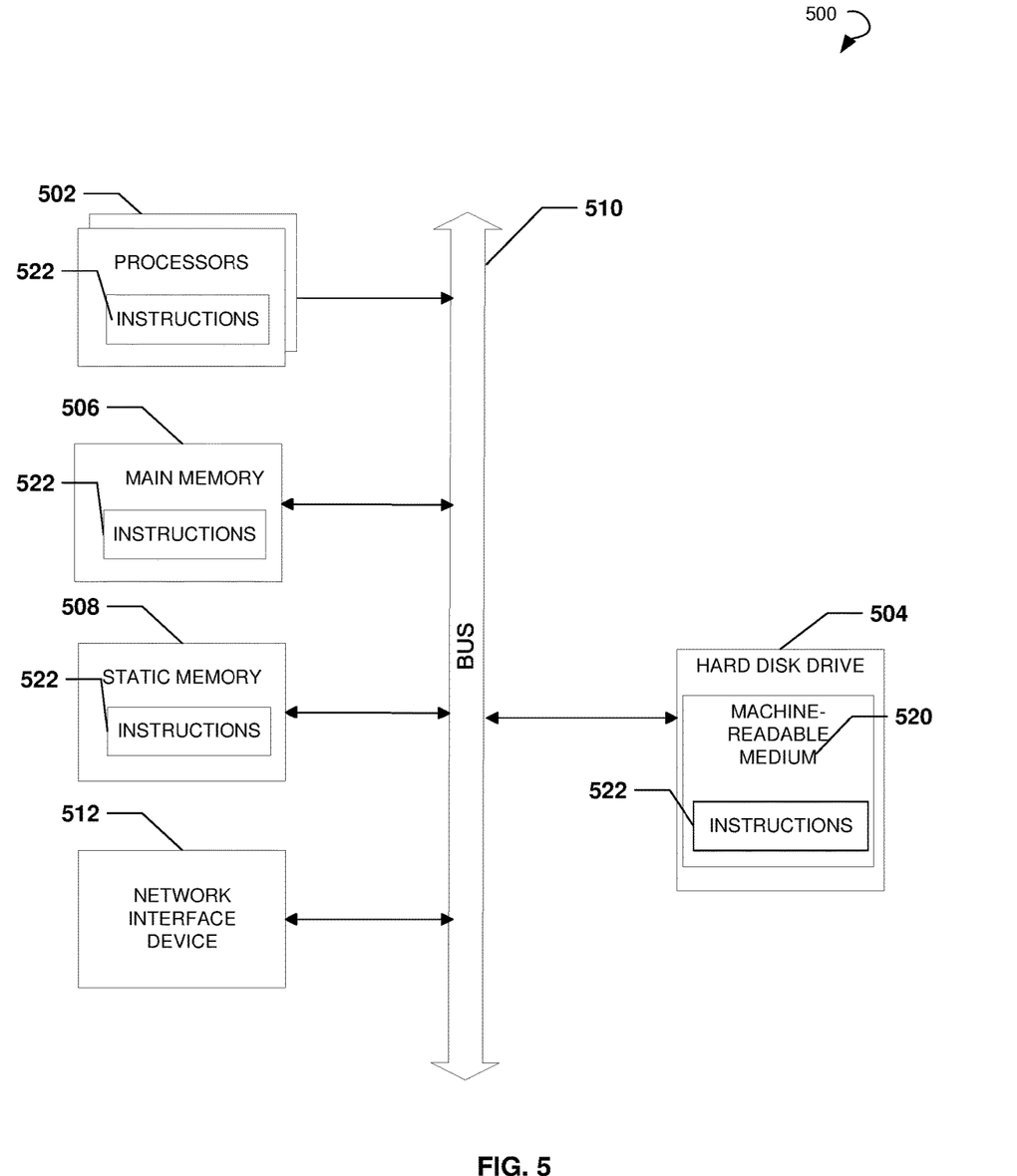
FIG. 5 shows a diagrammatic representation of a computing device for a machine in the exemplary electronic form of a computer system, within which a set of instructions for causing the machine to perform any one or more of the methodologies discussed herein can be executed.

FIG. 5 shows a diagrammatic representation of a computing device for a machine in the exemplary electronic form of a computer system 500, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box, a cellular telephone, a digital camera, a portable music player (e.g., a portable hard drive audio device, such as an Moving Picture Experts Group Audio Layer 3 player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processor or multiple processors 502, a hard disk drive 504, a main memory 506, and a static memory 508, which communicate with each other via a bus 510. The computer system 500 may also include a network interface device 512. The hard disk drive 504 may include a computer-readable medium 520, which stores one or more sets of instructions 522 embodying or utilized by any one or more of the methodologies or functions described herein. The instructions 522 can also reside, completely or at least partially, within the main memory 506 and/or within the processors 502 during execution thereof by the computer system 500. The main memory 506 and the processors 502 also constitute machine-readable media.

While the computer-readable medium 520 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random Access Memory (RAM), Read-Only Memory (ROM), and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a client device, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, nonvolatile media, volatile media and transmission media. Nonvolatile media include, for example, optical or magnetic disks, such as a fixed disk. Volatile media include dynamic memory, such as a system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a Compact Disc Read-Only Memory disk, a digital video disk, any other optical medium, any other physical medium with patterns of marks or holes, a RAM, a Programmable Read-Only Memory, an Erasable Programmable Read-Only Memory (EPROM), an Electrically Erasable Programmable Read-Only Memory, a FlashEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to a system RAM, from which the CPU retrieves and executes the instructions. The instructions received by the system RAM can optionally be stored on a fixed disk either before or after execution by the CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, computer-implemented methods and systems for managing interactions between a user and applications are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for facilitating travel reservations, the system comprising:
   a database configured with available travel itineraries and travel preferences for one or more users;
   a parser in communication with a processor and operable to:
      parse a travel-related query to derive at least one attribute related to the travel preferences for a user and a context from the travel-related query;
   the processor in communication with the database and operable to:
      receive the travel-related query from the user via a user device;
      receive the travel preferences for one or more further users from the database;
      construct a set of travel preferences for the user based on at least two of: the available travel itineraries in the database, the context from the travel-related query, and the travel preferences for the one or more further users;
   a scheduler in communication with the processor and operable to:
      search for a plurality of feasible travel itineraries based on the set of travel preferences;
      score each feasible travel itinerary of the plurality of feasible travel itineraries based on the set of travel preferences; and
      select at least one travel itinerary from the plurality of feasible travel itineraries based on the scoring.

2. The system of claim 1, wherein the travel related query includes one or more of: a natural language query, a typed text query, and a selection of preexisting options.

3. The system of claim 1, further comprising the travel preferences being responsive to the travel related query.

4. The system of claim 3, wherein the travel preferences comprise a preference learning element.

5. The system of claim 3, wherein the travel preferences comprise a preference representation.

6. The system of claim 1, further comprising the database configured to receive a rating and a recommendation of a traveler.

7. The system of claim 1, wherein the processor is further operable to:
   receive a feedback associated with the at least one travel itinerary from the user, wherein the feedback includes one or more of: a rating associated with the at least one travel itinerary, a recommendation associated with the at least one travel itinerary, and a review associated with the at least one travel itinerary; and
   update the travel preferences in the database with one or more of: the travel-related query and the feedback.

8. A method for facilitating travel reservations, the method comprising:
   configuring a database with available travel itineraries and travel preferences for one or more users;
   establishing a parser in communication with a processor and operable to:
      parse the travel-related query to derive at least one attribute related to the travel preferences for a user and a context from a travel-related query;
   receiving the travel-related query from the user via a user device;
   receiving the travel preferences for one or more further users from the database;
   constructing a set of travel preferences for the user based on at least two of: the available travel itineraries in the database, the context from the travel-related query, and the travel preferences for the one or more further users;
   searching for a plurality of feasible travel itineraries based on the set of travel preferences;
   scoring each feasible travel itinerary of the plurality of feasible travel itineraries based on the set of travel preferences; and
   selecting at least one travel itinerary from the feasible travel itineraries based on the scoring.

9. The method of claim 8, wherein the travel related query includes one or more of: a natural language query, a typed text query, and a selection of preexisting options.

10. The method of claim 8, further comprising the travel preferences being responsive to the travel related query.

11. The method of claim 10, further comprising configuring establishing a preference learning element.

12. The method of claim 10, further comprising configuring establishing a preference representation.

13. The method of claim 12, further comprising configuring the database to receive a rating and a recommendation of a traveler.

14. The method of claim 8, further comprising:
- receiving, by the processor, a feedback associated with the at least one travel itinerary from the user, wherein the feedback includes one or more of: a rating associated with the at least one travel itinerary, a recommendation associated with the at least one travel itinerary, and a review associated with the at least one travel itinerary; and
- updating, by the processor, the travel preferences in the database with one or more of: the travel-related query and the feedback.

15. A system for facilitating travel reservations, the system comprising:
- a database configured with available travel itineraries and travel preferences for one or more users;
- a parser in communication with a processor and operable to:
  - parse a travel-related query to derive at least one attribute related to the travel preferences for a user and a context from the travel-related query;
- the processor in communication with the database and operable to:
  - receive the travel-related query from the user via a user device, the travel-related query including at least a natural language query;
  - receive a selection of one or more identifiers from the user, wherein the one or more identifiers include one or more of: a gender, an age, an education, interests, and a hobby;
  - receive the travel preferences for one or more further users from the database;
  - construct a set of travel preferences for the user based on at least two of: the available travel itineraries in the database, the context for the travel-related query, and the travel preferences for the one or more further users;
  - receive a feedback associated with at least one travel itinerary from the user, wherein the feedback includes one or more of: a rating associated with the at least one travel itinerary, a recommendation associated with the at least one travel itinerary, and a review associated with the at least one travel itinerary;
- a scheduler in communication with the processor and operable to:
  - search for a plurality of feasible travel itineraries based on the set of travel preferences;
  - score each feasible travel itineraries of a plurality of feasible travel itineraries based on the set of travel preferences; and
  - select the at least one travel itinerary from the feasible travel itineraries based on the scoring.

16. The system of claim 15, further comprising the processor being operable to update the travel preferences in the database with one or more of: the travel-related query and the feedback.

* * * * *

UNITED STATES PATENT AND TRADEMARK OFFICE
CERTIFICATE OF CORRECTION

PATENT NO. : 11,262,203 B2
APPLICATION NO. : 16/854753
DATED : March 1, 2022
INVENTOR(S) : L. James Valverde, Jr. et al.

Page 1 of 1

It is certified that error appears in the above-identified patent and that said Letters Patent is hereby corrected as shown below:

In the Claims

In Claim 8, Column 12, Line 47, "the" should read -- a --; and
    Line 49, "from a" should read -- from the --.

In Claim 11, Column 13, Lines 3-4, delete "configuring".

In Claim 12, Column 13, Lines 5-6, delete "configuring".

Signed and Sealed this
Tenth Day of January, 2023

Katherine Kelly Vidal
*Director of the United States Patent and Trademark Office*